United States Patent
Bortnikov et al.

(10) Patent No.: US 9,329,950 B2
(45) Date of Patent: May 3, 2016

(54) EFFICIENT FAIL-OVER IN REPLICATED SYSTEMS

(71) Applicant: International Business Machines Corporation, Armonk, NY (US)

(72) Inventors: Vita Bortnikov, Haifa (IL); Shlomit Shachor, Yokneam Eilit (IL); Ilya Shnayderman, Jerusalem (IL); Gregory Chockler, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/145,939

(22) Filed: Jan. 1, 2014

(65) Prior Publication Data

US 2015/0186229 A1 Jul. 2, 2015

(51) Int. Cl.
*G06F 11/00* (2006.01)
*G06F 11/20* (2006.01)
*H04L 29/08* (2006.01)
*H04L 29/06* (2006.01)
*H04L 29/14* (2006.01)

(52) U.S. Cl.
CPC ........ *G06F 11/2028* (2013.01); *H04L 67/1051* (2013.01); *H04L 67/1095* (2013.01); *H04L 67/16* (2013.01); *H04L 67/34* (2013.01); *H04L 69/26* (2013.01); *H04L 69/40* (2013.01)

(58) Field of Classification Search
USPC ....................................................... 714/4.11
See application file for complete search history.

(56) References Cited

U.S. PATENT DOCUMENTS

| | | | | |
|---|---|---|---|---|
| 7,320,088 | B1 * | 1/2008 | Gawali | 714/6.1 |
| 8,473,775 | B1 * | 6/2013 | Helmick et al. | 714/4.11 |
| 8,904,224 | B2 * | 12/2014 | Kalyanaraman et al. | 714/4.11 |
| 9,021,296 | B1 * | 4/2015 | Kiselev et al. | 714/6.23 |
| 9,021,297 | B1 * | 4/2015 | Hayes et al. | 714/6.3 |
| 2006/0168011 | A1 * | 7/2006 | Lamport | 709/206 |
| 2008/0071878 | A1 * | 3/2008 | Reuter | 709/208 |
| 2012/0011398 | A1 * | 1/2012 | Eckhardt et al. | 714/15 |
| 2012/0042196 | A1 * | 2/2012 | Aron et al. | 714/4.11 |
| 2013/0036106 | A1 * | 2/2013 | Lucas | 707/703 |
| 2013/0110774 | A1 * | 5/2013 | Shah et al. | 707/610 |
| 2013/0282789 | A1 * | 10/2013 | Langworthy et al. | 709/203 |
| 2013/0325950 | A1 * | 12/2013 | Laden et al. | 709/204 |

* cited by examiner

*Primary Examiner* — Kamini Patel

(57) ABSTRACT

A method for selecting a leader node among a plurality of network nodes, comprising: providing a current configuration of selected nodes in replicated state machine based system, wherein a first node is set for handling commands received from clients; executing a consensus protocol by the selected nodes under the current configuration; identifying at least one fault indicative event of the first node; calculating a suggested configuration of selected nodes, wherein a second node is set for handling the commands; informing each member of the suggested configuration and the first node of the suggested configuration; executing the consensus protocol in parallel under both the suggested configuration and the current configuration; and when detecting that the first node is faulty, setting the second node for handling the commands under the current configuration in place of the first node and reconfiguring the current configuration to become the suggested configuration.

20 Claims, 3 Drawing Sheets

| Time | Regular Paxos protocol | Present invention protocol |
|---|---|---|
| 0 | Network node 201 fails | |
| T1 | Network node 204 suspects failure of network node 201 | |
| | | Network node 204 provides suggested configuration 210 |
| | | Network node 204 proposes suggested configuration 210 at configuration 209 |
| | Client command 211 is stored | Network node 204 proposes client command 211 at suggested configuration 210 |
| T2 | Network node 201 failure detected | |
| | Network node 204 starts reconfiguration process at configuration 209 | |
| T2+RTT | Network node 204 becomes leader of configuration 209 | |
| | Network node 204 proposes suggested configuration 210 at configuration 209 | |
| T2+2RTT | Configuration 210 is decided | |
| | Network node 204 proposes client command 211 | Network node 204 decides on client command 211 |
| T2+3RTT | Network node 204 decides on client command 211 | |

FIG. 2B

EFFICIENT FAIL-OVER IN REPLICATED SYSTEMS

BACKGROUND

The present invention, in some embodiments thereof, relates to a fault tolerant consensus protocol and, more specifically, but not exclusively, to a leader reselection process in a fault tolerant consensus protocol.

Replicated state machine (RSM) approach is an important tool for maintaining the integrity of distributed applications and services in failure-prone data centers and cloud computing environments. Paxos is a protocol used in RSM-based systems to create a consensus among a replication group of network nodes. The Paxos protocol includes some of the nodes acting as proposers, and one proposer being a leader that handles commands received from a client. The leader is selected out of the current members of the replication group of network nodes by a leader selection process. When the leader experiences failover, it is replaced by another network node as leader following a leader change process.

The performance of the Paxos protocol depends on the leader's availability. In particular, the leader failures may render the service managed by the RSM-based system temporarily unavailable for client communication thereby negatively affecting its latency and throughput.

SUMMARY

According to an aspect of some embodiments of the present invention there is provided.

According to some embodiments of the present invention there is provided a method for selecting a leader node among a plurality of network nodes, comprising: providing a current configuration of selected nodes from a plurality of network nodes in replicated state machine based system, wherein a first node from the plurality of network nodes is set for handling commands received from clients; executing a consensus protocol by the selected nodes under the current configuration; identifying at least one fault indicative event of the first node; calculating a suggested configuration of selected nodes from the plurality of network nodes, wherein a second node from the plurality of network nodes is set for handling the commands; informing each member of the suggested configuration from the plurality of network nodes and the first node of the suggested configuration; executing the consensus protocol in parallel under both the suggested configuration and the current configuration; and when detecting that the first node is faulty, setting the second node for handling the commands under the current configuration in place of the first node and reconfiguring the current configuration to become the suggested configuration.

Optionally, the method is performed as part of a Paxos protocol.

Optionally, the method further comprises: when detecting that the first node is not faulty, removing the suggested configuration.

Optionally, the method further comprises, after the informing the first node of the suggested configuration: when the first node agrees to the suggested configuration, setting the second node for handling the commands under the current configuration in place of the first node and reconfiguring the current configuration to become the suggested configuration.

Optionally, the detecting that the first node is faulty is done on a predefined time after the identifying the at least one fault indicative event of the first node.

More optionally, the predefined time is within a range of 10 seconds to 50 seconds.

Optionally, the plurality of network nodes are server computing devices.

Optionally, the plurality of network nodes are individual personal computing devices.

According to an aspect of some embodiments of the present invention there is provided a computer readable medium comprising computer executable instructions adapted to perform the method.

According to some embodiments of the present invention there is provided a method for taking leadership among a plurality of network nodes, comprising: executing a consensus protocol under a current configuration of selected nodes from a plurality of network nodes in replicated state machine based system, wherein a first node from the plurality of network nodes is set for handling commands received from clients; identifying at least one fault indicative event of the first node; calculating a suggested configuration of selected nodes from the plurality of network nodes, and setting to handle the commands under the suggested configuration; informing each member of the suggested configuration from the plurality of network nodes and the first node of the suggested configuration; executing the consensus protocol in parallel under both the suggested configuration and the current configuration; and when detecting that the first node is faulty, setting to handle the commands under the current configuration in place of the first node and reconfiguring the current configuration to become the suggested configuration.

According to some embodiments of the present invention there is provided a computer program product for selecting a leader node among a plurality of network nodes, comprising: a computer readable storage medium; first program instructions to execute a consensus protocol under a current configuration of selected nodes from a plurality of network nodes in replicated state machine based system, wherein a first node from the plurality of network nodes is set for handling commands received from clients; second program instructions to calculate a suggested configuration of selected nodes from the plurality of network nodes when identifying at least one fault indicative event of the first node, wherein a second node from the plurality of network nodes is set for handling the commands; third program instructions to inform each member of the suggested configuration from the plurality of network nodes and the first node of the suggested configuration; fourth program instructions to execute the consensus protocol in parallel under both the suggested configuration and the current configuration; and fifth program instructions to set the second node for handling the commands under the current configuration in place of the first node and to reconfigure the current configuration to become the suggested configuration, when detecting that the first node is faulty; wherein the first, second, and third program instructions are stored on the computer readable storage medium.

According to some embodiments of the present invention there is provided a replicated state machine based system comprising: a plurality of network nodes performing a fault tolerant consensus protocol; a current configuration of selected nodes from the plurality of network nodes wherein the consensus protocol is executed under the current configuration; a first node from the plurality of network nodes set for handling commands received from clients in the current configuration and having at least one fault indicative event; and a suggested configuration of selected nodes from the plurality of network nodes wherein a second node from the plurality of network nodes is set for handling the commands in the suggested configuration; wherein the consensus protocol is executed under the suggested configuration in parallel to the consensus protocol being executed under the current configuration; wherein when the first node is detected as faulty the second node is set for handling the commands under the current configuration in place of the first node and the current configuration is reconfigured to become the suggested configuration.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2B is a table comparing a latency of processing an exemplary client command under regular Paxos protocol versus the protocol of the system in FIG. 2A, according to some embodiment of the present invention.

DETAILED DESCRIPTION

Figure 1:
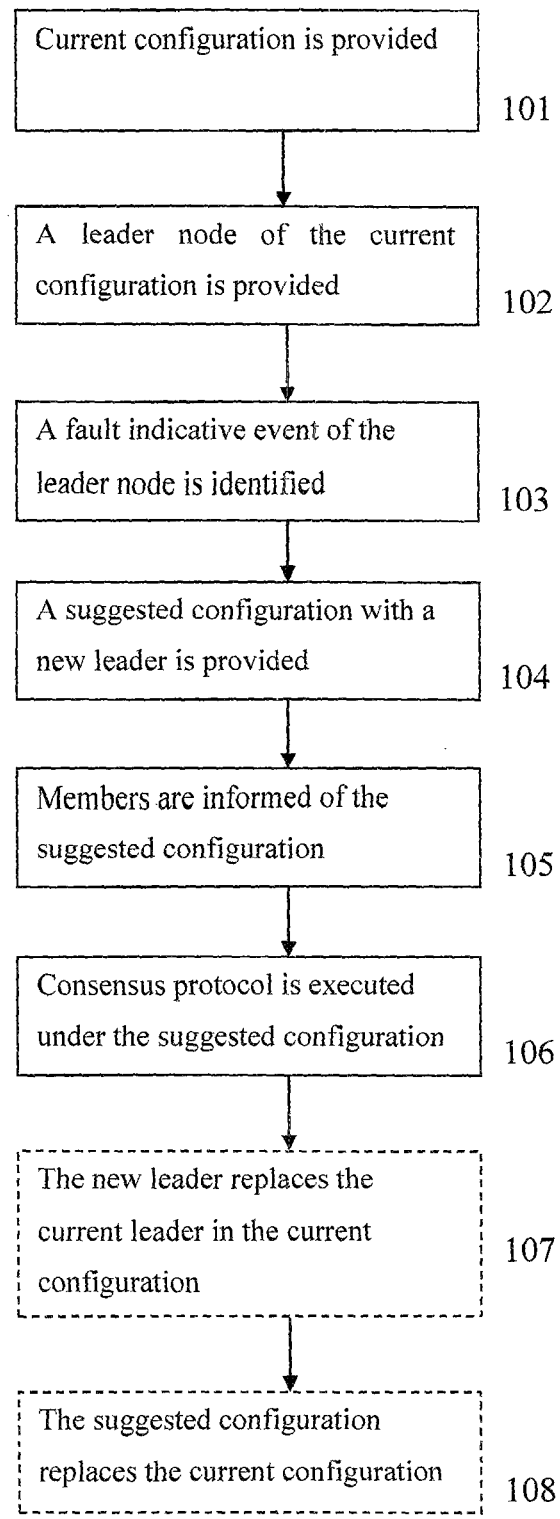
FIG. 1 is a flowchart schematically representing a method for reselecting upon failover a leader in a fault tolerant consensus protocol in a RSM-based system, according to some embodiment of the present invention.

The present invention, in some embodiments thereof, relates to a fault tolerant consensus protocol and, more specifically, but not exclusively, to a leader reselection process in a fault tolerant consensus protocol.

According to some embodiments of the present invention, there are provided methods and systems for efficiently replacing a node set for handling client commands in a Paxos-like protocol, called a leader, by a new leader upon failover. In these methods and systems, leader replacement process starts when a failover is suspected, thereby accelerating its completion when the failover is determined.

Nodes may be individual personal computing devices, server computing devices, or other devices that have sufficient processor and storage abilities to perform the tasks required by the system. Replicated nodes contain a replica of the same program. A RSM-based system contains a number of replicated nodes, each one executing its part in the service provided by the RSM-based system. Paxos is a fault tolerant consensus protocol for solving consensus in a network of unreliable nodes. Paxos is used herein as an example throughout this application, as the advantages of this invention are most beneficial in it. However, this invention may also be implemented in other Paxos-like protocols, such as the ZooKeeper's atomic broadcast (ZAB) protocol; group broadcast (Gbcast) protocol or the consistent object replication layer (COReL) protocol.

In regular Paxos, a configuration is defined where a group of nodes are defined as proposers and one of them is defined as leader and is responsible for handling client requests or commands. One of the other proposers in the group may suspect that the leader is faulty, for example, after no response is received from the leader for a certain period indicating a communication failure or when receiving a message indicating a failure of the leader process. The suspecting node waits for another period before concluding that the leader is faulty and defining a new configuration with itself as leader. This waiting time affects the latency and throughput of the service provided by the RSM-based system.

In some embodiments of this invention, the suspecting node defines a suggested configuration with itself, or another node, as leader after suspecting the failure of the leader, but before concluding that the leader has failed. The suggested configuration runs in parallel to the existing configuration during the waiting time. When the suspicion proves to be false so the leader is not faulty and responds during the waiting time, the suggested configuration is abandoned and the execution of the protocol resumes under the existing configuration. However, when the suspecting node concludes that the leader is faulty, the suggested configuration replaces the existing configuration.

Running the suggested configuration in parallel to the existing configuration uses free network and computing resources as it is performed during the waiting time. Therefore, when the suspicion proves to be false, there is no difference in performance between Paxos and the new protocol presented in this invention. However, when the suspicion is a real failure, then the new protocol has an advantage over regular Paxos. The new protocol utilizes available bandwidth, during the waiting time, to process incoming requests, while in Paxos there is a need to store the requests at the replicated nodes. Storing incoming requests requires buffer space at the nodes, and when the request rate is sufficiently high, the system may need to either eventually stop accepting new requests to avoid buffer overflow, causing throughput to degrade; or may need to start rejecting the incoming requests rendering the service unavailable.

The new protocol presented allows the RSM-based system to continue processing client requests during the failover periods, hence improving both throughput and utilization. Also, the new protocol presented makes one transfer step in parallel with another transfer step, thus improving latency of the overall reselection process of the new leader.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart schematically representing a method for reselecting upon failover a leader in a fault tolerant consensus protocol in a RSM-based system, according to some embodiment of the present invention.

First, as shown at 101, a current configuration of the fault tolerant consensus protocol is provided. The configuration may include any number of nodes acing as proposers. One of the proposers is a leader node of the current configuration. The leader may be any one of the nodes acting as proposers. The leader is set to handle commands received from clients.

Then, as shown at 102, the fault tolerant consensus protocol is executed by the nodes.

A second node from the group of nodes acting as proposers under the current configuration uses a failure detector to monitor the status of the leader node. The failure detector receives confirmations from nodes every predetermined period and reports about their responsiveness. The predetermined period may be, for example, 1, 10, 50 seconds or any intermediate or longer period. As shown at 103, a fault indicative event of the leader node, such as non-responsiveness, is identified by the second node. For example, when the leader does not send a confirmation after the predetermined period. The second node suspects the failure of the leader, but waits a predetermined period of waiting time before determining that the leader has failed. The waiting time is long, for example, the waiting time is the predetermined period multiplied by 2, 3, 4 or any intermediate, smaller or larger number. This reduces unnecessary reselections of leader as the process of reselection requires time and therefore reduces the performance of the system.

Then, as shown at 104, the second node provides a suggested configuration with itself as leader in the time of suspecting the failure of the leader. This is done during the waiting time in order to efficiently use the available time to prepare for leader reselection and process commands received from clients at this time. The suggested configuration may include any selection of nodes included in the RSM-based system to act as proposers. Also, the suggested configuration may include the current leader node as a non-leader proposer. Optionally, the second node may appoint a third node as leader of the suggested configuration; however this does not improve the performance of the algorithm.

Now, as shown at 105, members of the suggested configuration are informed of the suggested configuration by the leader of the suggested configuration. Also, the leader of the existing configuration is informed of the suggested configuration. When the leader of the existing configuration receives the notification, it may either decide to pass an agreement on the suggested configuration as a message in the existing configuration, or decide to ignore the notification. When an agreement is passed, the suggested configuration replaces the existing configuration.

As shown at 106, consensus protocol is executed under the suggested configuration. Upon receiving the notification from the leader of the suggested configuration, each member of the suggested configuration starts using the suggested configuration for the client commands. The suggested configuration is used in parallel to the existing configuration, so new client commands received by any member are sent to the leaders of both the existing configuration and the suggested configuration.

As shown at 107, when the waiting time expired without any response from the leader of the existing configuration received by the leader of the suggested configuration, the leader of the suggested configuration becomes the leader of existing configuration through regular leader election protocol. The same node is therefore leader of both the suggested configuration and the existing configuration.

Finally, as shown at 108, the suggested configuration replaces the current configuration by the leader passing a reconfiguration agreement for the suggested configuration as a message in the existing configuration.

Figure 2A:
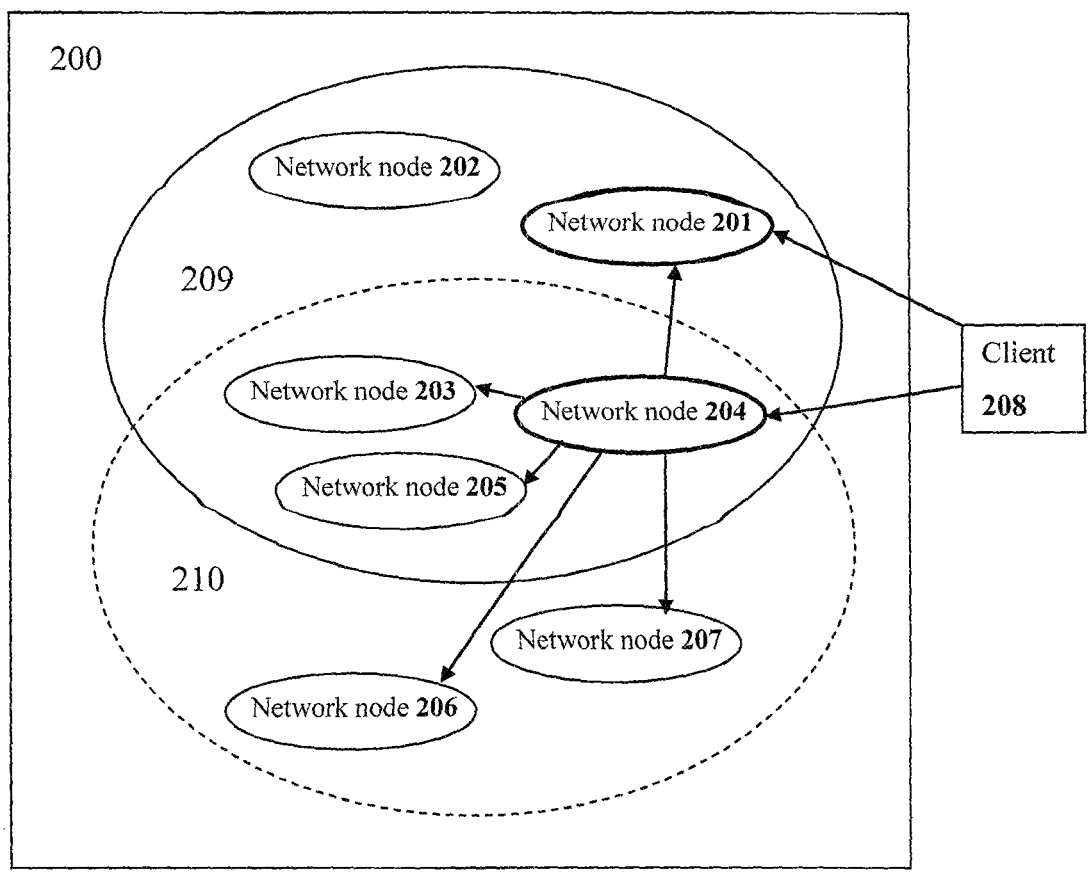
FIG. 2A is an exemplary RSM-based system with fault tolerant consensus protocol, according to some embodiment of the present invention.

Reference is now made to FIG. 2A, which is an exemplary RSM-based system with fault tolerant consensus protocol, according to some embodiment of the present invention. The system 200 includes network nodes 201-207. An existing configuration 209 includes network nodes 201-205 as proposers. Network node 201 is leader of existing configuration 209 and handles commands received from client 208. Network node 204 suspects a failover of network node 201. Network node 204 provides a suggested configuration 210, which includes network nodes 203-207, and network node 204 as leader of suggested configuration 210. Suggested configuration 210 operates in parallel with existing configuration 209, so commands received from client 208 are handled by both network node 201 and network node 204. When the suspicion proves to be true and network node 201 fails, network node 204 takes the leadership of existing configuration 209 and replaces it with suggested configuration 210.

Reference is now made to FIG. 2B, which is a table comparing a latency of processing an exemplary client command under regular Paxos protocol versus the protocol of the system in FIG. 2A, according to some embodiment of the present invention.

At time 0, network node 201, which is the leader of existing configuration 209, fails. At time T1, network node 204 suspects a failure of network node 201. In regular Paxos protocol, network node 204 now waits until time T2 to detect network node 201 as failed and client command 211 is stored. However, in the Present invention protocol, this time is used by network node 204 to provide suggested configuration 210, propose suggested configuration 210 at configuration 209 and propose client command 211 at suggested configuration 210.

At time T2, network node 204 detects network node 201 as failed and starts reconfiguration process at configuration 209. The after one round-trip time (RTT) of the reconfiguration process, at time T2+RTT, network node 204 becomes leader of configuration 209. In regular Paxos protocol, network node 204 now proposes suggested configuration 210 at configuration 209, which was already done at T1 in the present invention protocol. At T2+2RTT, configuration 210 is decided. In regular Paxos protocol, network node 204 now proposes client command 211, which was already done at T1 in the present invention protocol. In the present invention protocol, network node 204 now decides on client command 211. In regular Paxos protocol, this can only be done at T2+2RTT. The latency of client command 211 in regular Paxos protocol is T2+3RTT whereas the latency is only T2+2RTT in the present invention protocol.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant fault tolerant consensus protocols will be developed and the scope of the term fault tolerant consensus protocol is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for selecting a leader node among a plurality of network nodes, comprising:
   providing a current configuration of selected nodes from a plurality of network nodes in replicated state machine based system, wherein a first node from said plurality of network nodes is set for handling commands received from clients, wherein each of said selected nodes contains a replication of said state machine;
   executing a consensus protocol by said selected nodes under said current configuration;
   identifying at least one fault indicative event of said first node;
   calculating a suggested configuration of selected nodes from said plurality of network nodes, wherein a second node from said plurality of network nodes is set for handling said commands, wherein at least one of said plurality of network nodes is selected for a first of said current configuration and said suggested configuration and not selected for a second of said current configuration and suggested configuration, wherein said second node and said first node are not the same node;
   informing each member of said suggested configuration about said suggested configuration;
   informing said first node about said suggested configuration;
   executing said consensus protocol under said suggested configuration in parallel to executing said consensus protocol under said current configuration; and
   when detecting that said first node is faulty, setting said second node for handling said commands under said current configuration in place of said first node and reconfiguring said current configuration to become said suggested configuration.

2. The method of claim 1 performed as part of a Paxos protocol.

3. The method of claim 1, further comprising:
   when detecting that said first node is not faulty, removing said suggested configuration.

4. The method of claim 1, further comprising, after said informing said first node about said suggested configuration:
   when said first node agrees to said suggested configuration, setting said second node for handling said commands under said current configuration in place of said first node and reconfiguring said current configuration to become said suggested configuration.

5. The method of claim 1, wherein said detecting that said first node is faulty is done on a predefined time after said identifying said at least one fault indicative event of said first node.

6. The method of claim 5, wherein said predefined time is within a range of 10 seconds to 50 seconds.

7. The method of claim 1, wherein said plurality of network nodes are server computing devices.

8. The method of claim 1, wherein said plurality of network nodes are individual personal computing devices.

9. A non-transitory computer readable medium comprising computer executable instructions adapted to perform the method of claim 1.

10. A method for taking leadership among a plurality of network nodes, comprising:
    executing a consensus protocol under a current configuration of selected nodes from a plurality of network nodes in replicated state machine based system by said selected nodes, wherein a first node from said plurality of network nodes is set for handling commands received from clients, wherein each of said selected nodes contains a replication of said state machine;
    identifying at least one fault indicative event of said first node;
    calculating a suggested configuration of selected nodes from said plurality of network nodes, and setting to handle said commands under said suggested configuration, wherein at least one of said plurality of network nodes is selected for a first of said current configuration and said suggested configuration and not selected for a second of said current configuration and suggested configuration;
    informing each member of said suggested configuration about said suggested configuration;
    informing said first node about said suggested configuration;

executing said consensus protocol under said suggested configuration in parallel to executing said consensus protocol under said current configuration; and when detecting that said first node is faulty, setting to handle said commands under said current configuration in place of said first node and reconfiguring said current configuration to become said suggested configuration.

11. The method of claim 10 performed as part of a Paxos protocol.

12. The method of claim 10, further comprising:

when detecting that said first node is not faulty, removing said suggested configuration.

13. A replicated state machine based system comprising:

a plurality of network nodes performing a fault tolerant consensus protocol; wherein each of said plurality of network nodes is a computing device;

a current configuration of selected nodes from said plurality of network nodes wherein said consensus protocol is executed by said selected nodes under said current configuration;

a first node from said plurality of network nodes set for handling commands received from clients in said current configuration and having at least one fault indicative event; and a suggested configuration of selected nodes from said plurality of network nodes wherein a second node from said plurality of network nodes is set for handling said commands in said suggested configuration, wherein at least one of said plurality of network nodes is selected for a first of said current configuration and said suggested configuration and not selected for a second of said current configuration and suggested configuration, wherein said second node and said first node are not the same node;

wherein said consensus protocol is executed under said suggested configuration in parallel to said consensus protocol being executed under said current configuration;

wherein when said first node is detected as faulty said second node is set for handling said commands under said current configuration in place of said first node and said current configuration is reconfigured to become said suggested configuration.

14. The system of claim 13, wherein said consensus protocol is performed as part of a Paxos protocol.

15. The system of claim 13, wherein when said first node is detected as not faulty, said suggested configuration is removed.

16. The system of claim 13, wherein when said first node agrees to said suggested configuration, said second node is set for handling said commands under said current configuration in place of said first node and said current configuration is reconfigured to become said suggested configuration.

17. The system of claim 13, wherein said detection of said first node as faulty is done on a predefined time after said at least one fault indicative event of said first node.

18. The system of claim 17, wherein said predefined time is within a range of 10 seconds to 50 seconds.

19. The system of claim 13, wherein said plurality of network nodes are server computing devices.

20. The system of claim 13, wherein said plurality of network nodes are individual personal computing devices.

* * * * *